No. 876,748. PATENTED JAN. 14, 1908.
T. C. TOBIN.
RIDING ATTACHMENT FOR HARROWS.
APPLICATION FILED SEPT. 17, 1906.

Witnesses
Frank B Hoffman
C. C. Hiner

Inventor
Thomas C. Tobin
By Victor J. Evans
Attorney

UNITED STATES PATENT OFFICE.

THOMAS C. TOBIN, OF ADAMS, WISCONSIN.

RIDING ATTACHMENT FOR HARROWS.

No. 876,748.  Specification of Letters Patent.  Patented Jan. 14, 1908.

Application filed September 17, 1906. Serial No. 334,838.

*To all whom it may concern:*

Be it known that I, THOMAS C. TOBIN, a citizen of the United States of America, residing at Adams, in the county of Green and State of Wisconsin, have invented new and useful Improvements in Riding Attachments for Harrows, of which the following is a specification.

This invention relates to a riding truck or attachment for toothed harrows or the like, the object of the invention being to provide a riding truck which is simple of construction and embodies certain advantages in features of construction and operation, as hereinafter fully described and claimed.

Figure 1:
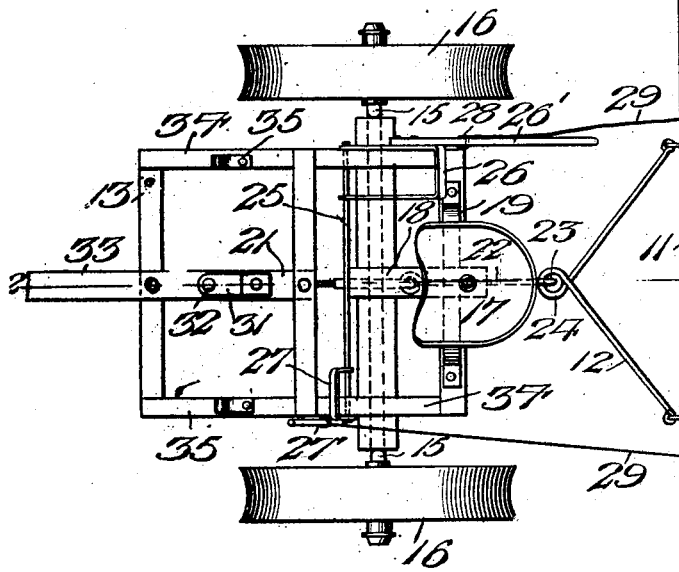
Figure 2:
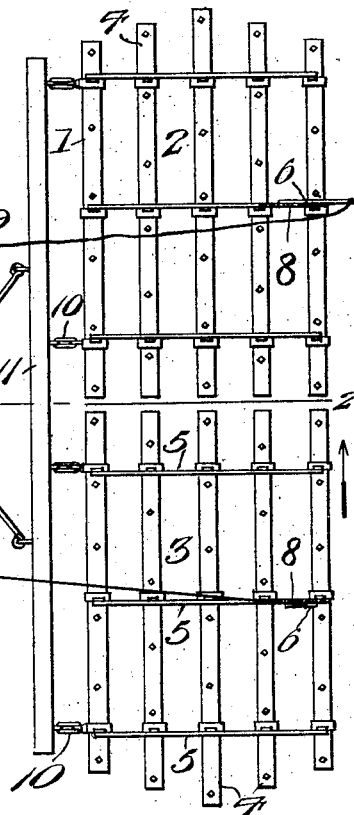
Figure 2:
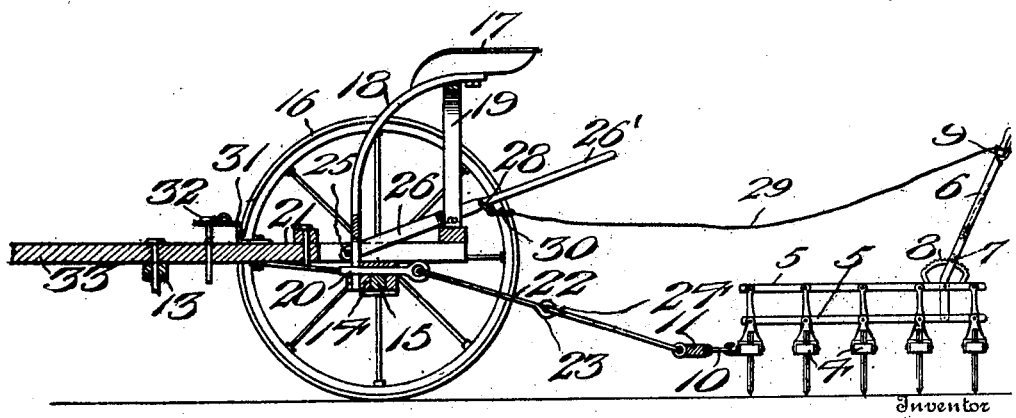

In the accompanying drawings,—Figure 1 is a top plan view of a harrow and truck embodying my invention. Fig. 2 is a section of the same on line 2—2 of Fig. 1.

Referring to the drawings, the numeral 1 designates a harrow of any preferred construction, as shown in the present instance comprising a pair of sections 2 and 3, each consisting of a series of bars 4 carrying sets of harrow teeth. The bars of each set are connected by suitable link connections 5, by which they are adapted to be rocked, each set of link connections including an adjusting lever 6 provided with a spring actuated pawl 7 to engage a relatively stationary rack 8, the pawl being connected to the usual form of controlling latch 9 carried by the lever. By means of the levers 6, one of which is provided upon each harrow section, the bars of the latter may be rocked whenever required and the harrow tilted upwardly and forwardly on the front row of teeth to pass over obstructions. The front bars of the harrow sections are connected by links or clevises 10 with a draft bar 11 to which is pivotally connected a draft yoke or member 12.

The riding attachment or truck comprises a suitable frame 13 carrying a bolster 14 to which is secured an axle 15 having mounted thereon suitable ground or carrying wheels 16. The driver's seat 17 is carried by a supporting standard 18 secured to and rising from the bolster and stayed by an arched brace 19 secured to the rear cross bar of the frame. Passing through the bolster is a coupling bolt 20 secured at its forward end to the frame hound 21, the rear end of the bolt being formed with an eye to which is pivotally connected a draft rod or link 22 provided at its rear end with a hook 23 to detachably engage an eye 24 on the yoke or draft member 12. This draft connection secures the harrow to the truck in the center line of draft, and it will be seen that by the described construction and arrangement the truck is arranged in front instead of in rear of the harrow, thus enabling the driver to have better control of the draft animals and to secure greater comfort in the operation of harrowing, as he is out of the way of the dust created by the harrow teeth.

Fixed in and extending transversely across the frame 13, is a rod 25 on which are journaled or pivoted a pair of U-shaped straps or yokes 26 and 27, the free ends of the arms of which pivotally engage said rod, while the return or cross-portions of said yokes form foot-engaging members adapted to be engaged by the feet of the driver, whereby said yokes serve the function of foot levers. To the outer arms of these levers 26 and 27, are fixed hand levers 26' and 27', each of which carries a clevis 28. Wires or other flexible connections 29 are provided at their forward ends with snap hooks 30 to detachably engage said clevises 28 and are connected at their rear ends in any suitable manner with the respective adjusting levers of the two harrow sections 2 and 3. It will thus be understood that through the medium of the levers 26' and 27' and the connections above described, the harrow sections may be conveniently tilted upwardly and forwardly at any time by the operator on the forward row of harrow teeth as the fulcrum, to enable the harrow sections to freely pass over obstructions of various kinds and prevent the teeth from being clogged by weeds or trash. Upon releasing the levers 26' and 27', the harrow sections will be restored or fall back to normal position by gravity. When it is desired to tilt the harrows to any considerable height or when the harrows are of such weight as to require material force to tilt them, foot pressure on the yokes 26 and 27 may be employed in connection with hand pressure on the levers 26' and 27' to secure the required additional power. This construction enables both hand or foot power, or both, to be applied at will to manipulate the harrow, thus increasing the efficiency of the harrow tilting means without a complexity of structure.

The hound or frame bar 21 carries a clevis 31 and a king bolt 32 for pivotal connection with the truck of an ordinary tongue 33 or the draft bar of an evener, to which the draft animals are attached. The bars 34 are provided with suitable stops 35 to limit the tongue or evener in its swinging movements when the horses are turned to steer the truck and harrow, said stops serving to positively connect the tongue or evener and truck for a turning movement and to prevent the tongue or evener from coming in contact with the ground wheels 16. It will be understood that by this construction the draft animals may be turned as short as desired to steer the truck and harrow to the right or left without danger of running them into the harrow sections, as is liable to occur when the team is hinged directly to the harrow. The driver is also close to the draft animals and may properly control them to pull to an equal degree. By means of the lever mechanism the harrow sections may be adjusted at will to pass obstructions and prevent breakage of the harrow teeth. By simply disconnecting the hook 23 from the yoke 12 and the snaps 30 from the clevises 28 the riding attachment may be quickly and conveniently removed from the harrow, allowing the latter to be left in the field for further use while the driver rides, if desired, on the truck from the field to the house.

Having thus described the invention, what is claimed as new, is:—

1. In a riding attachment for harrows, the combination with a harrow provided with teeth adjusting mechanism including a lever and means for locking it in adjusted position, of a truck arranged in advance thereof and having a draft connection with the harrow, a combined foot and hand lever supported upon the truck, and a flexible connection between said lever and the adjusting lever.

2. In a riding attachment for harrows, the combination with a harrow comprising sections, each embodying tooth carrying bars and an adjusting lever therefor provided with means for locking it in adjusted position, of a wheeled truck arranged in advance of the harrow, a pair of combined hand and foot levers mounted upon the truck, and flexible connections between said levers and the respective adjusting levers of the harrow sections.

3. In a riding attachment for harrows, the combination of a harrow comprising sections, each including a series of tooth-carrying bars provided with adjusting mechanism including a lever and means for locking it in adjusted position, a draft bar connected with said harrow sections, a wheeled truck arranged in advance of the harrow, draft members detachably connected with each other and pivotally connected with the draft bar and truck, a seat supported on the truck, combined hand and foot levers arranged upon the truck on opposite sides of said seat, and flexible connections between said truck and the respective adjusting levers of the harrow sections.

4. A draft truck for harrows comprising a wheeled supporting frame, a seat mounted upon the frame, and combined hand and foot levers arranged upon the frame on opposite sides of the seat.

5. A draft truck for harrows comprising a wheeled supporting frame, a seat mounted upon the frame, yokes arranged on opposite sides of the seat and having the free ends of their arms pivoted to the frame and their cross portions arranged to be engaged by the feet of the driver, thus adapting the yokes to serve as foot levers and hand levers connected with the outer arms of said yokes.

6. A draft truck for harrows comprising a wheeled supporting frame, a seat mounted upon the frame, a rod extending transversely of the frame in advance of the seat, yoke-shaped foot levers pivotally mounted on said rod, and hand levers carried by said foot levers.

In testimony whereof, I affix my signature in presence of two witnesses.

THOMAS C. TOBIN.

Witnesses:
F. A. WADDINGTON,
W. L. TOBIN.